US010279611B2

(12) United States Patent
Olores et al.

(10) Patent No.: US 10,279,611 B2
(45) Date of Patent: May 7, 2019

(54) COMMUNICATION TERMINAL DEVICE AND COMMUNICATION SYSTEM

(71) Applicant: KYOCERA Document Solutions Inc., Osaka (JP)

(72) Inventors: Anthony Olores, Osaka (JP); Lianney Deleverio, Osaka (JP); Fernando Dagoc, Jr., Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/509,117

(22) PCT Filed: Dec. 18, 2015

(86) PCT No.: PCT/JP2015/085567
§ 371 (c)(1),
(2) Date: Mar. 6, 2017

(87) PCT Pub. No.: WO2016/129179
PCT Pub. Date: Aug. 18, 2016

(65) Prior Publication Data
US 2017/0341444 A1 Nov. 30, 2017

(30) Foreign Application Priority Data

Feb. 10, 2015 (JP) .................................. 2015-024435

(51) Int. Cl.
H04N 1/00 (2006.01)
G06F 3/12 (2006.01)
(Continued)

(52) U.S. Cl.
CPC .......... B41J 29/38 (2013.01); G03G 15/5075 (2013.01); G03G 21/00 (2013.01);
(Continued)

(58) Field of Classification Search
None
See application file for complete search history.

(56) References Cited

U.S. PATENT DOCUMENTS 8,730,505 B2    5/2014  Maeda et al.
9,009,468 B1*   4/2015  Zayed ................ H04L 63/0272
                                                     713/164
(Continued)

FOREIGN PATENT DOCUMENTS

JP      2003-167863 A    6/2003
JP      2009-104259 A    5/2009
(Continued)

OTHER PUBLICATIONS

Notice of Reasons for Refusal dated May 8, 2018 mailed in the corresponding Japanese Patent Application No. 2016-574635.

Primary Examiner — Beniyam Menberu
(74) Attorney, Agent, or Firm — IP Business Machines Solutions, LLC

(57) ABSTRACT

A communication terminal device includes: an application acquisition section that acquires an application prepared to operate an image forming apparatus; an instruction acceptance section that accepts an operation instruction for processing indicated by the application; a processing executing section that makes the application runnable under an operating system of the communication terminal device and executes, in accordance with the application, the processing indicated by the operation instruction accepted by the instruction acceptance section; and a communication section that sends to the image forming apparatus a result of the processing executed by the processing executing section and an operation request.

4 Claims, 17 Drawing Sheets

(51) Int. Cl.
*G06K 15/02* (2006.01)
*B41J 29/38* (2006.01)
*G03G 21/00* (2006.01)
*G03G 15/00* (2006.01)

(52) U.S. Cl.
CPC ............ *H04N 1/00* (2013.01); *H04N 1/0035* (2013.01); *H04N 1/00127* (2013.01); *H04N 1/00204* (2013.01); *H04N 1/00209* (2013.01); *H04N 1/00307* (2013.01); *H04N 1/00424* (2013.01)

(56) References Cited

U.S. PATENT DOCUMENTS

| | | | | |
|---|---|---|---|---|
| 2003/0107762 A1* | 6/2003 | Kinoshita | ............ | G06Q 10/107 358/1.15 |
| 2005/0226641 A1* | 10/2005 | Ando | ............ | G03G 15/00 399/8 |
| 2007/0198999 A1* | 8/2007 | Ohhashi | ............ | G06F 9/54 719/328 |
| 2009/0316176 A1* | 12/2009 | Fujimori | ............ | H04N 1/00244 358/1.13 |
| 2012/0162716 A1 | 6/2012 | Maeda et al. | | |
| 2013/0027743 A1* | 1/2013 | Enami | ............ | G06F 3/1204 358/1.15 |
| 2013/0342866 A1* | 12/2013 | Hansen | ............ | H04N 1/4413 358/1.14 |
| 2013/0347097 A1 | 12/2013 | Pan | | |
| 2014/0011477 A1* | 1/2014 | Shaikh | ............ | H04W 4/14 455/411 |
| 2014/0022587 A1* | 1/2014 | Coccia | ............ | G01S 19/14 358/1.15 |
| 2014/0089538 A1* | 3/2014 | Bachrany | ............ | G06F 3/00 710/37 |
| 2014/0185082 A1* | 7/2014 | Yamada | ............ | G06F 3/1206 358/1.14 |
| 2015/0355918 A1* | 12/2015 | Ohhashi | ............ | G06F 9/455 703/24 |
| 2016/0034775 A1* | 2/2016 | Meadow | ............ | H04N 5/232 382/182 |
| 2017/0109104 A1* | 4/2017 | Dahlberg | ............ | G06F 8/654 |

FOREIGN PATENT DOCUMENTS

| | | |
|---|---|---|
| JP | 2011-133935 A | 7/2011 |
| JP | 2012-138800 A | 7/2012 |
| JP | 2014-7644 A | 1/2014 |

* cited by examiner

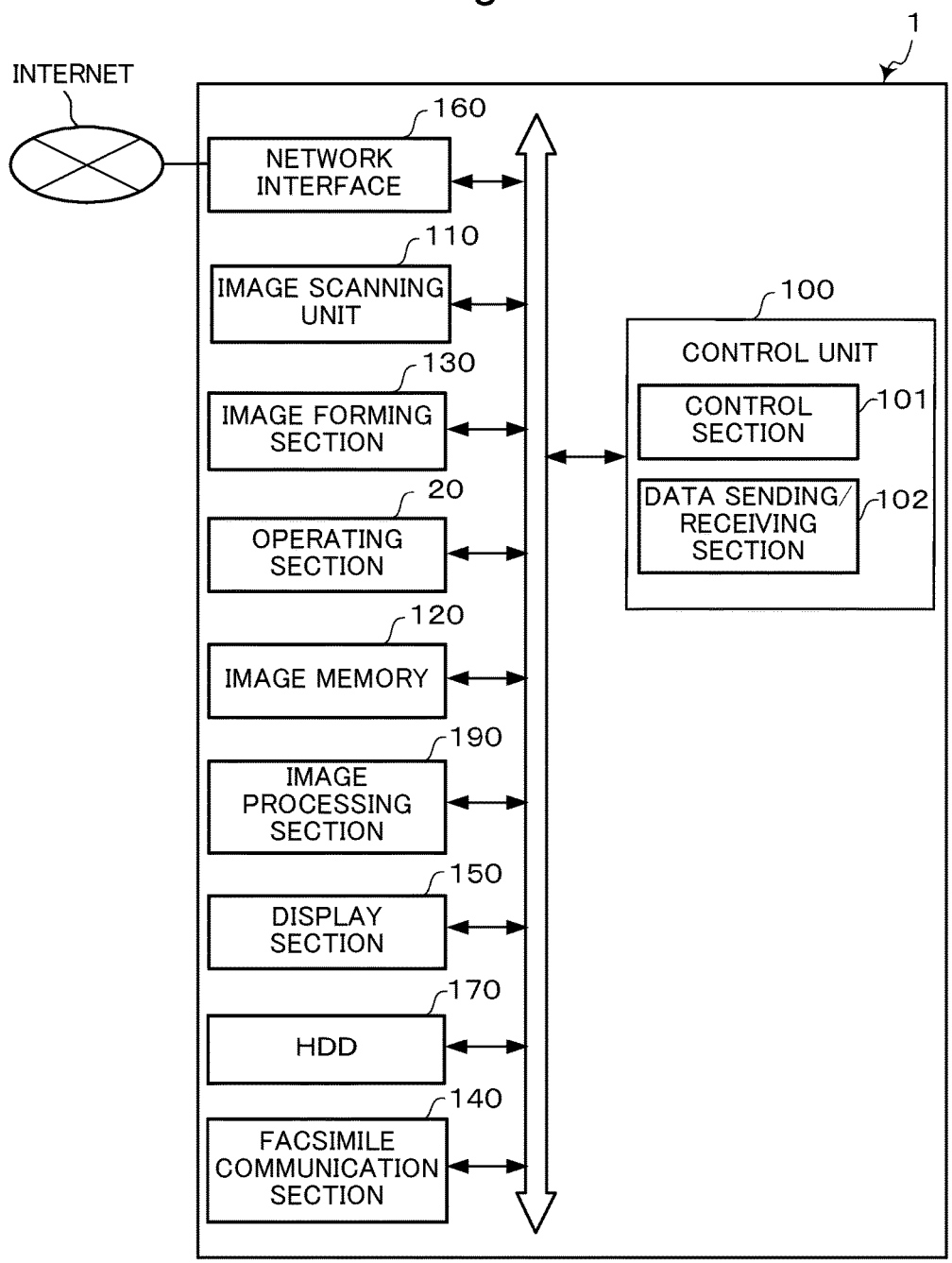

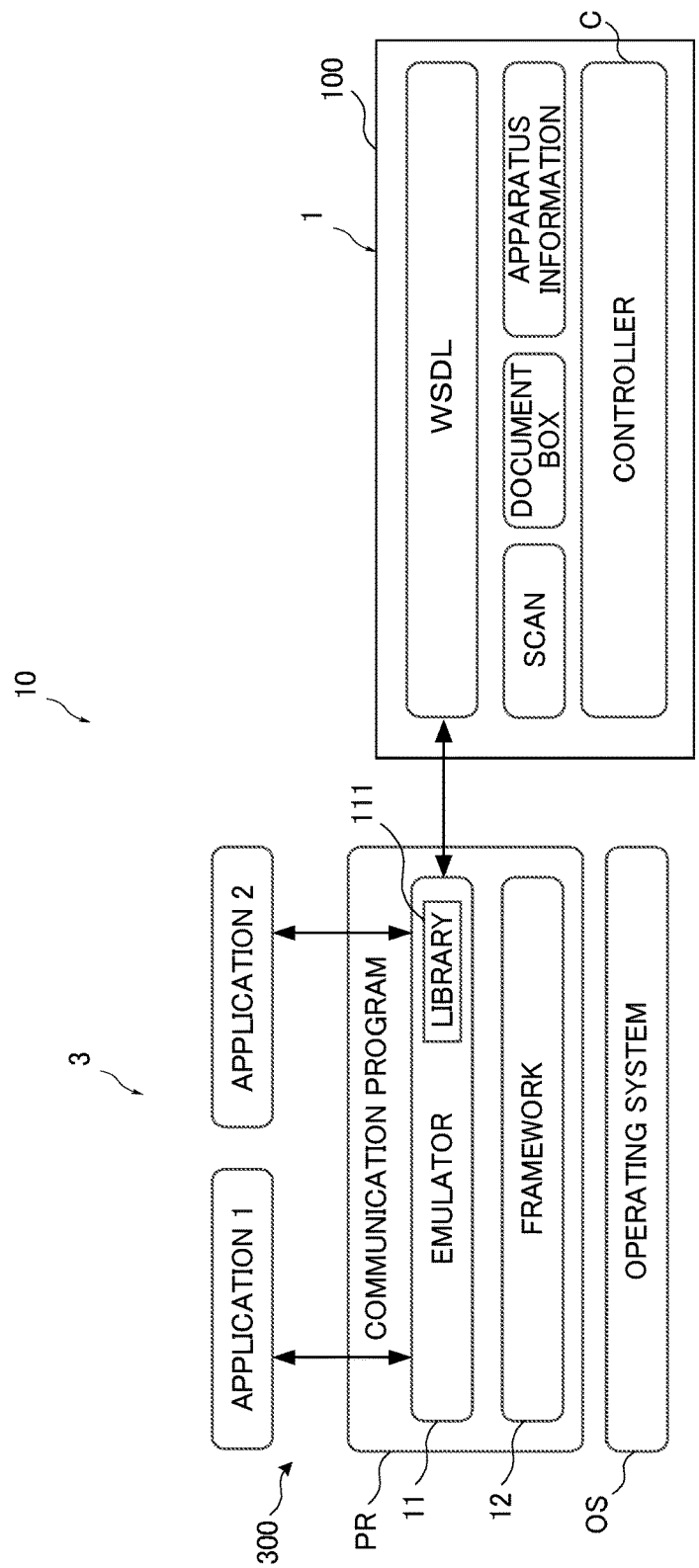

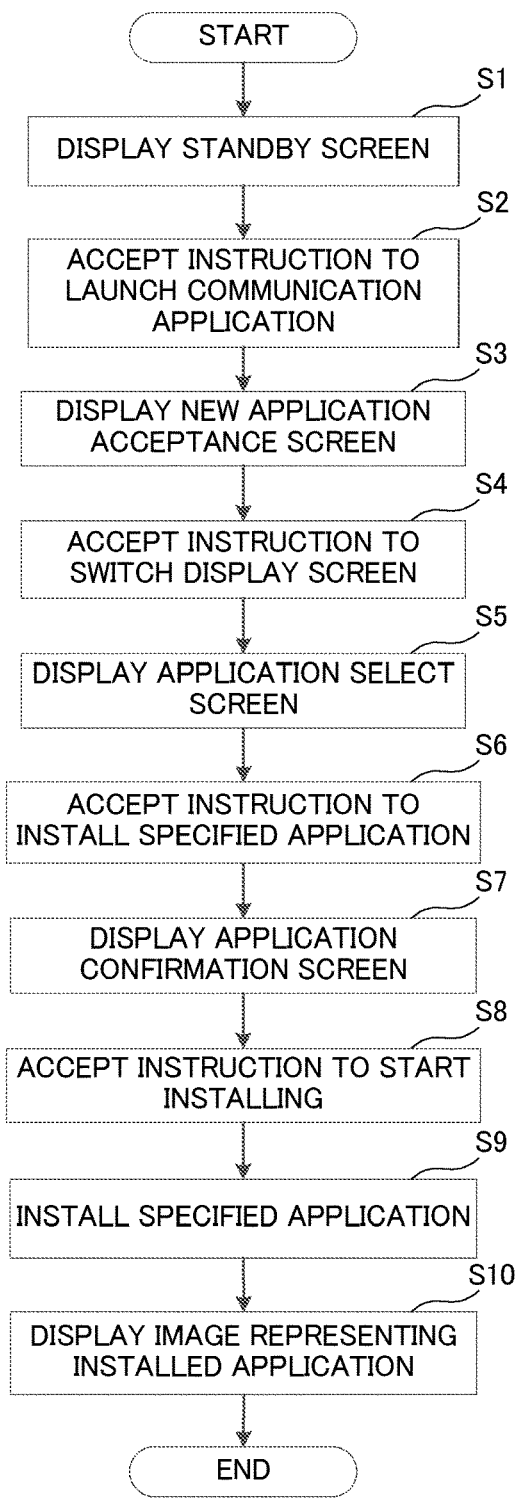

COMMUNICATION TERMINAL DEVICE AND COMMUNICATION SYSTEM

TECHNICAL FIELD

The present invention relates to communication terminal devices and communication systems and particularly relates to a technique for operating an electronic apparatus with a communication terminal device.

BACKGROUND ART

Image forming apparatuses, such as a multifunction peripheral, are designed to be capable of performing not only copying or printing but also various functions, such as sending a scanned document to a personal computer on a network and allowing the computer to store the document in its storage region (see Patent Literature 1 below). To make such an image forming apparatus able to perform various functions as above, applications corresponding to the respective functions are installed on the image forming apparatus.

CITATION LIST

Patent Literature

Patent Literature 1: JP-A-2012-138800

SUMMARY OF INVENTION

In these days, to further improve the functionality of the image forming apparatuses, the image forming apparatuses are also required to have a function to cooperate with communication terminal devices. However, communication terminal devices do not sufficiently have operability to operate an image forming apparatus configured multifunctionally as described above in cooperation with the image forming apparatus. Furthermore, to make an image forming apparatus more multifunctional, it is necessary to install many such applications as described above on the image forming apparatus. However, the possible number of applications to be installed depends on the capacity of an HDD, a memory or the like of the image forming apparatus and, therefore, the possible number of applications to be installed on a single image forming apparatus is limited.

The present invention has been made in view of the foregoing problems and an object thereof is to impart to a communication terminal device an operability to operate an image forming apparatus in cooperation with the image forming apparatus and to enable the image forming apparatus to perform a new function without installing any application on the image forming apparatus.

A communication terminal device according to an aspect of the present invention includes:

an application acquisition section that acquires an application prepared to operate a predetermined electronic apparatus;

an instruction acceptance section that accepts an operation instruction for processing indicated by the application acquired by the application acquisition section;

a processing executing section that makes the application runnable under an operating system of a computer and executes, in accordance with the application, the processing indicated by the operation instruction accepted by the instruction acceptance section; and a communication section that sends to the electronic apparatus a result of the processing executed by the processing executing section and an operation request.

Furthermore, a communication system according to an aspect of the present invention includes a communication terminal device and an image forming apparatus, the communication terminal device including:

an application acquisition section that acquires an application prepared to operate a predetermined electronic apparatus;

an instruction acceptance section that accepts an operation instruction for processing indicated by the application acquired by the application acquisition section;

a processing executing section that makes the application runnable under an operating system of a computer and executes, in accordance with the application, the processing indicated by the operation instruction accepted by the instruction acceptance section; and a communication section that sends to the electronic apparatus a result of the processing executed by the processing executing section and an operation request, the image forming apparatus including:

a receiving section that receives the result of the processing and the operation request from the communication section of the communication terminal device; and a control section that allows an operating mechanism of the image forming apparatus to perform processing associated with the result of the processing and the operation request received by the receiving section.

Advantageous Effects of Invention

The present invention imparts to the communication terminal device an operability to operate the image forming apparatus in cooperation with the image forming apparatus and enables the image forming apparatus to perform a new function without installing any application on the image forming apparatus.

BRIEF DESCRIPTION OF DRAWINGS

FIG. 3 is a block diagram showing a schematic of the internal configuration of an image forming apparatus.

FIG. 4 is a diagram showing the architecture of an application in the communication terminal device and the image forming apparatus.

FIG. 7 is a flowchart showing a flow of processing in installing the application on the communication terminal device.

DESCRIPTION OF EMBODIMENTS

Figure 1:
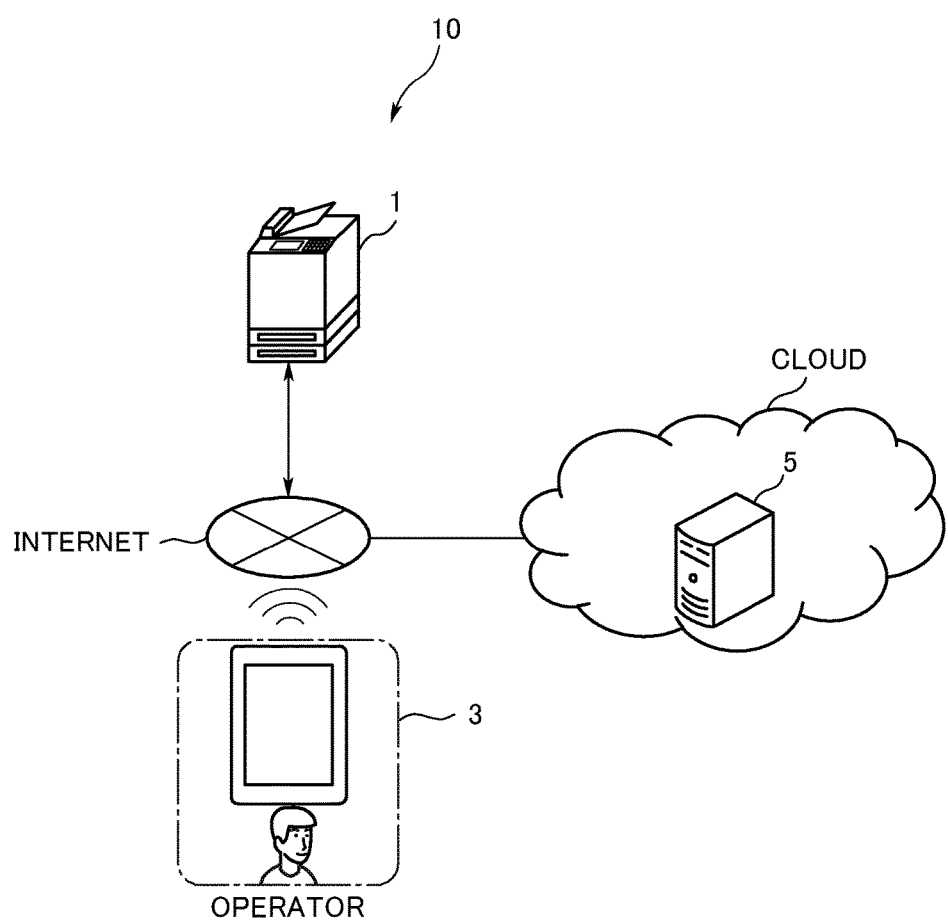
FIG. 1 is a diagram showing a communication system including a communication terminal device according to one embodiment of the present invention.

Hereinafter, a description will be given of a communication program, a communication terminal device, an image forming apparatus, and a communication system all according to one embodiment of the present invention with reference to the drawings. FIG. 1 is a diagram showing a communication system including a communication terminal device according to one embodiment of the present invention.

A communication system 10 according to one embodiment of the present invention includes an image forming apparatus 1 and a communication terminal device 3.

The communication terminal device 3 is a tablet terminal, a smartphone or the like. The communication terminal device 3 has an Internet communication function and has a structure capable of sending and receiving data to and from the image forming apparatus 1 through HTTP communication via the Internet.

In accordance with an application and a communication program installed on the communication terminal device 3, the communication terminal device 3 accepts from an operator an operation instruction for operating the image forming apparatus 1, performs processing for the image forming apparatus 1 based on the operation instruction, and sends a result of the processing and an operation request to the image forming apparatus 1. The sending of the processing result and the operation request from the communication terminal device 3 to the image forming apparatus 1 is performed through HTTP communication via the Internet.

Furthermore, the communication terminal device 3 can access a server 5 in a cloud via the Internet by performing an operation in accordance with the application and has a function to download and acquire data stored on a storage device of the server 5 and send and upload data to the storage device.

The image forming apparatus 1 is, for example, a so-called multifunction peripheral having a plurality of functions, such as a printer, a copier, and a facsimile machine. The image forming apparatus 1 has an Internet communication function and performs, according to this communication function, sending and receiving of data to and from the communication terminal device 3 via the Internet. In the image forming apparatus 1, processing associated with the processing result and operation request sent from the communication terminal device 3 is performed. Note that the image forming apparatus 1 is an example of the predetermined electronic apparatus in Claims.

Figure 2:
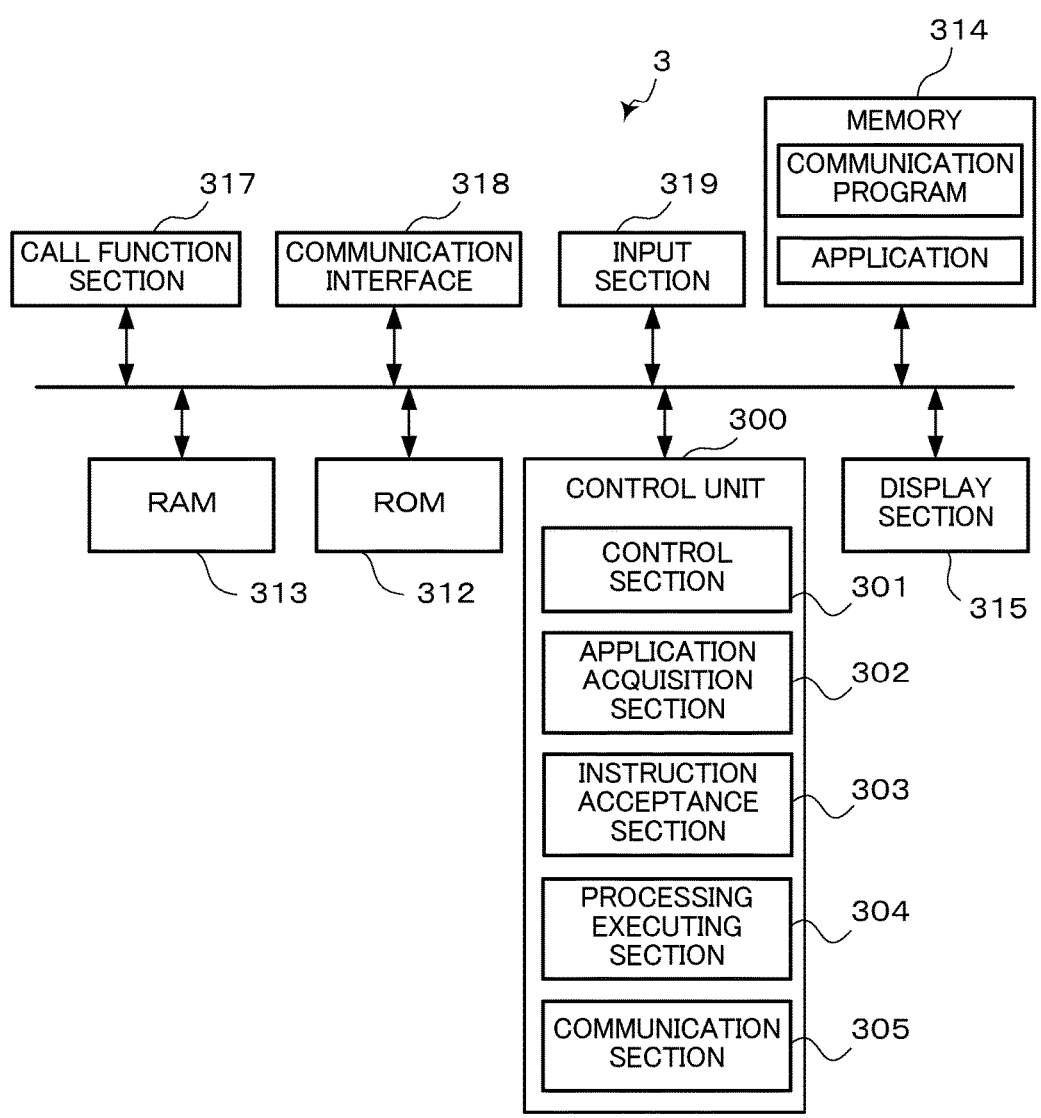
FIG. 2 is a block diagram showing a schematic configuration of the communication terminal device.

Next, a description will be given of the configuration of the communication terminal device 3. FIG. 2 is a block diagram showing a schematic configuration of the communication terminal device 3.

The communication terminal device 3 includes a control unit 300, a ROM 312, a RAM 313, a memory 314, a display section 315, a call function section 317, a communication interface 318, and an input section 319. These sections are capable of sending and receiving data or a signal through a signal line (such as a CPU bus) to and from each other.

The control unit 300 is formed of a CPU and so on. The ROM 312 stores an operation program for basic operations of the communication terminal device 3. The RAM 313 is used as a work area or the like for the control unit 300.

The memory 314 is a storage medium for storing various types of data and programs. A communication program according to one embodiment of the present invention is installed in the memory 314. Furthermore, an application prepared to operate the image forming apparatus 1 is also installable in the memory 314.

The communication program cooperates with the installed application to run the application under an operating system of the communication terminal device 3. The communication program is a program that, based on the application, allows the communication terminal device 3 to accept from the operator an entry of an operation instruction for the image forming apparatus 1, perform processing based on the operation instruction, and send the processing result and an operation request to the image forming apparatus 1 via the Internet.

The control unit 300 operates in accordance with the above communication program to function as a control section 301 (in terms of, among functions of the control section 301, a function associated with the communication with the image forming apparatus 1), an application acquisition section 302, an instruction acceptance section 303, a processing executing section 304, and a communication section 305. However, each of the control section 301, the application acquisition section 302, the instruction acceptance section 303, the processing executing section 304, and the communication section 305 may not be implemented by the operation in accordance with the communication program but can be constituted by a hardware circuit.

The control section 301 governs the operation control of each section included in the communication terminal device 3.

The application acquisition section 302 accepts from the operator a selection of the above application prepared to operate the image forming apparatus (an example of the predetermined electronic apparatus) 1 and acquires the accepted application. For example, the application is stored in an external storage medium, such as an SD card. For example, the communication terminal device 3 allows the application acquisition section 302 to access the SD card through the communication interface 318, read from the SD card the application specified by the operator, and store (install) the application in the memory 314.

The instruction acceptance section 303 accepts from the operator an execution instruction to execute processing to be executed by the communication program in cooperation with and based on the application.

The processing executing section 304 executes the processing indicated by the execution instruction accepted by the instruction acceptance section 303, based on the application, under an operating system used in the control unit 300.

The communication section 305 sends via the Internet to the image forming apparatus 1 a result of the processing executed by the processing executing section 304 and an operation request, which is an execution instruction to execute processing to be performed by the image forming apparatus 1 using the processing result, and receives from the image forming apparatus 1 information indicating a responsive result responding to the processing result and the operation request.

Next, a description will be given of the configuration of the image forming apparatus 1. FIG. 3 is a block diagram showing a schematic of the internal configuration of the image forming apparatus 1.

The image forming apparatus 1 includes: a control unit 100 that controls the functions of components of the apparatus; the image scanning unit 110; an image memory 120 that temporally stores data on a document image scanned by the image scanning unit 110 or other data; an image forming section 130; an operating section 20; and a display section 150 formed of an LCD (liquid crystal display) or others. The operating section 20 accepts entry of various instructions to execute various operations from the operator.

The image forming apparatus 1 further includes a network interface 160, a facsimile communication section 140, an HDD 170, and an image processing section 190.

The facsimile communication section 140 performs various functions necessary for facsimile communication.

The HDD 170 stores a communication control program managing the operation of the image forming apparatus 1 for performing communication with the communication terminal device 3, image data obtained by the scanning of the image scanning unit 110, and so on.

The network interface 160 performs communication via the Internet or a LAN with external devices, for example, the communication terminal device 3 and a server in a cloud.

The image processing section 190 performs edition/processing (coding/decoding, scaling up/down, compression/expansion) of the image data scanned by the image scanning unit 110.

The control unit 100 includes: a CPU; a ROM in which an operation control program for controlling the overall operation of the image forming apparatus 1 is stored; a RAM that stores various types of data and functions as a work area; and a memory that stores setting values for parameters for various controls, such as a non-volatile memory, and governs the operations of the components of the apparatus in a manner that the operation program stored in the ROM is executed by the CPU.

The control unit 100 includes a control section 101 and a data sending/receiving section 102.

For example, the control unit 100 operates in accordance with the communication control program stored on the HDD 170 to function as the control section (only in terms of a function associated with communication with the communication terminal device 3) 101 and the data sending/receiving section 102 and allow each operating mechanism of the image forming apparatus 1 to operate based on the processing result and the operation request both sent from the communication terminal device 3.

The control section 101 controls each mechanism included in the image forming apparatus 1 and governs the overall operation control of the image forming apparatus 1.

The data sending/receiving section (an example of the receiving section in Claims) 102 communicates through the network interface 160 with the communication terminal device 3, receives from the communication terminal device 3 the above processing result and operation request, and sends to the communication terminal device 3 information indicating a responsive result responding to the processing result and operation request. The control section 101 allows the operating mechanism of the image forming apparatus 1 to perform processing associated with the processing result and operation request received by the data sending/receiving section 102.

Next, a description will be given of the processing to be executed by the communication program in cooperation with the application. FIG. 4 is a diagram showing the architecture of an application in the communication terminal device 3 and the image forming apparatus 1. Here, a description will be given of processing performed on the communication terminal device 3 and the image forming apparatus 1 from the viewpoint of effects of the stored application.

In the communication terminal device 3, the communication program and the operating system for the communication terminal device 3 are stored in the memory 314. When in this state the application is installed into the memory 314, the communication program cooperates with the application, so that the control unit 300 operates through the communication program in accordance with the application, thus performing processing for operating the image forming apparatus 1 and processing necessary for communication with the image forming apparatus 1.

As shown in FIG. 4, in the control unit 300 of the communication terminal device 3, the communication program PR runs under the operating system OS of the communication terminal device 3. The communication program PR has the functions of an emulator 11 and a framework 12.

The emulator 11 is, for example, an OSGi bundle and can be formed of an API. The emulator 11 serves as the control section 301 (in terms of, among the functions of the control section 301, the function associated with the communication with the image forming apparatus 1), the application acquisition section 302, the instruction acceptance section 303, the processing executing section 304, and the communication section 305.

The framework 12 is, for example, an OSGi framework and an infrastructure system for managing dynamic addition and execution of Java (registered trademark) modules.

The emulator 11 is combined with the framework 12 to fulfill the function to emulate each function executable by an application acquired by the application acquisition section 302 and installed in the memory 314.

Furthermore, the emulator 11 has a library 111. The library 111 is a group of codes for use in allowing the function indicated by the application to run under the operating system OS. When accepting from the operator an execution instruction to execute the function of the application, the emulator retrieves a code necessary to execute the function from the library 111 and executes the instructed function based on the retrieved code and the application.

Specifically, when an application is acquired by the application acquisition section 302 and installed into the memory 314, the emulator 11 cooperates with the application to execute the function indicated by the instruction input from the operator, using the associated code in the library 111 in accordance with the application. Thus, the function of the application can be performed by the communication terminal device 3.

In other words, when the application is installed on the communication terminal device 3, a program integrated with the function of the emulator 11 to execute processing associated with the operation of the image forming apparatus 1 is formed. The emulator 11 intervenes between the application and the operating system so that the application can run under the operating system used in the control unit 300 of the communication terminal device 3.

Furthermore, the emulator 11 has the function to communicate with the image forming apparatus 1 via the Internet over HTTP.

In the image forming apparatus 1, the communication control program is stored on the HDD 170. The communication control program is formed by, for example, WSDL (Web Services Description Language) and the control unit 100 operates in accordance with the communication control program to perform a Web service. WSDL is an XML-based language for describing Web services. Furthermore, the control unit 100 functions as a controller C to manage the scan operation, the document storage operation, apparatus information, and so on.

When the control unit 100 operates in accordance with WSDL, the data sending/receiving section 102 receives the above-described processing result and operation request via the Internet from the communication terminal device 3 to perform the Web service. Thus, the controller C of the control unit 100 enables each operating mechanism of the image forming apparatus 1 to perform an operation indicated by the operation request. For example, when the operation request is to perform a scan operation, the controller C allows the image scanning unit 110 to perform a scan operation. Note that the roles of the control unit 100 as the control section 101 and the data sending/receiving section 102 are achieved by the operation of the control unit 100 in accordance with WSDL and by the controller C.

When the controller C allows the operation based on the operation request to be performed, the control unit 100 operates in accordance with WSDL to send a processing result of the operation via the Internet to the communication terminal device 3. For example, when the controller C allows a scan operation indicated by the operation request to be performed, the control unit 100 operates in accordance with WSDL to send via the Internet to the communication terminal device 3 image data obtained by scanning based on the scan operation together with information indicating the completion of the scan operation.

When in the communication terminal device 3 the emulator 11 receives via the Internet from the image forming apparatus 1 the processing result: in the above example, the image data obtained by scanning based on the scan operation and the information indicating the completion of the scan operation, the emulator 11 sends and stores the image data, based on the application, for example, on a storage device of a server in a specified cloud. In this example, the application has the function to allow a storage device of a server in a cloud or other storage devices to store image data obtained by scanning of the image forming apparatus 1 or other data.

Next, a description will be given of processing in installing the application on the communication terminal device 3. FIGS. 5A, 5B, 6A, 6B, and 6C are views showing examples of a screen displayed on the display section 315 of the communication terminal device 3 in installing the application on the communication terminal device 3. FIG. 7 is a flowchart showing a flow of processing in installing the application on the communication terminal device 3.

Figure 5A:
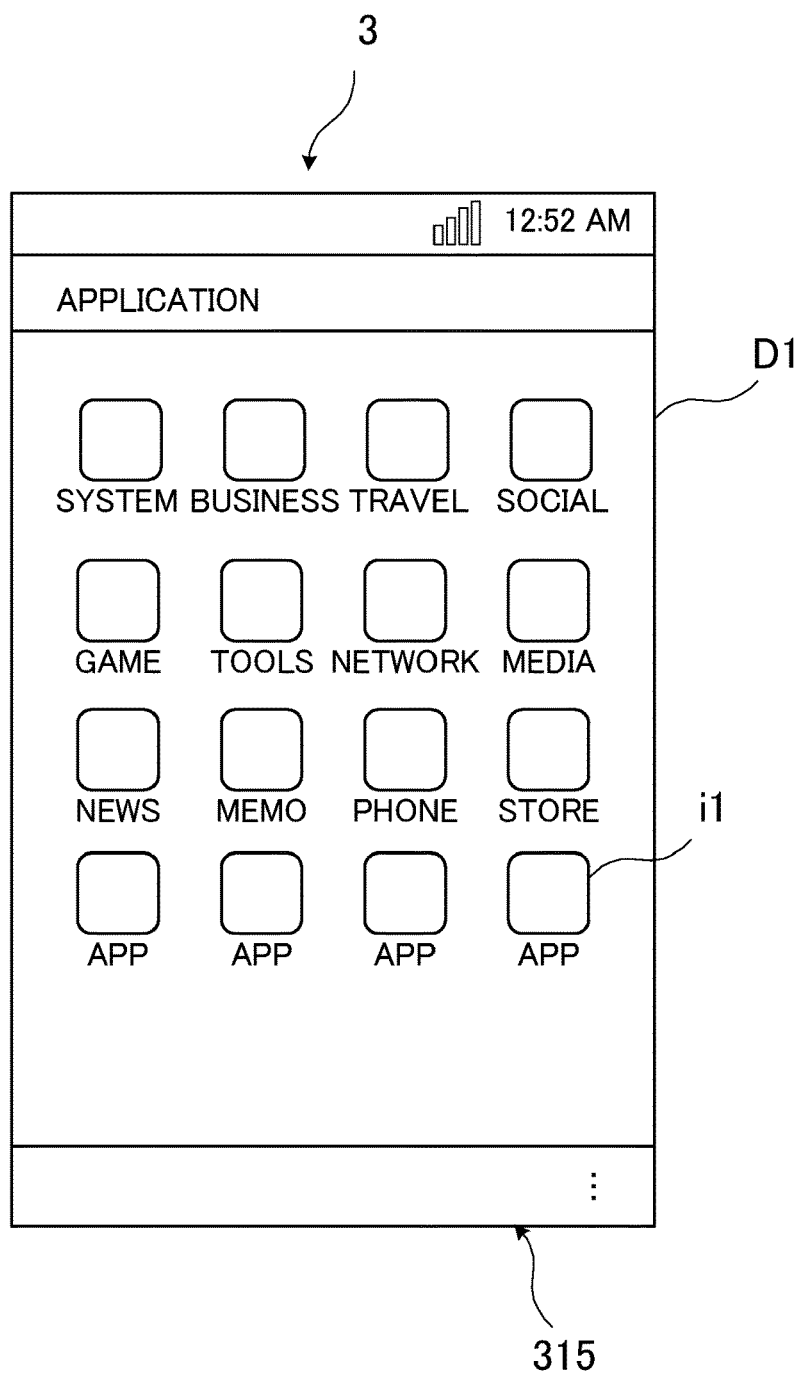
FIG. 5A is a view showing an example of a screen displayed on a display section of the communication terminal device in installing the application on the communication terminal device.

Normally, in the communication terminal device 3, the control section 301 allows an icon i1 representing the above communication application to be displayed on a standby screen D1 of the display section 315, as shown in FIG. 5A (S1). When in this state the operator touches a region of the display screen of the display section 315 where the icon i1 is displayed, a touch panel provided in the display section 315 functions as the input section 319 to accept a launch instruction to launch the communication application (S2).

Figure 5B:
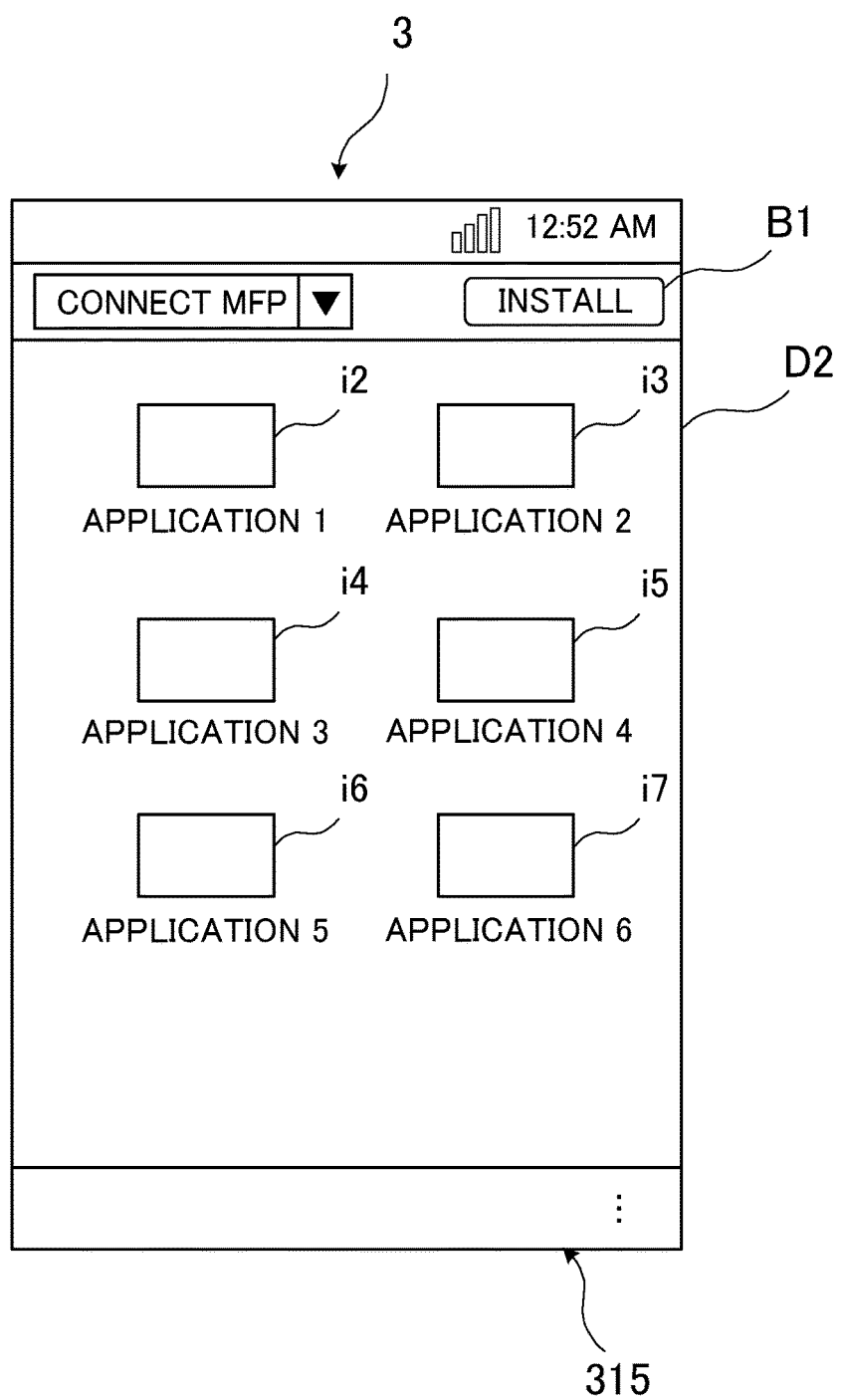
FIG. 5B is a view showing an example of a screen on the display section of the communication terminal device in installing the application on the communication terminal device.

When the launch instruction is accepted, the control section 301 allows the display section 315 to display a new application acceptance screen D2 shown as an example in FIG. 5B (S3). On this new application acceptance screen D2, an install instruction acceptance button B1 and icons i2-i7 representing already installed applications are displayed.

Figure 6A:
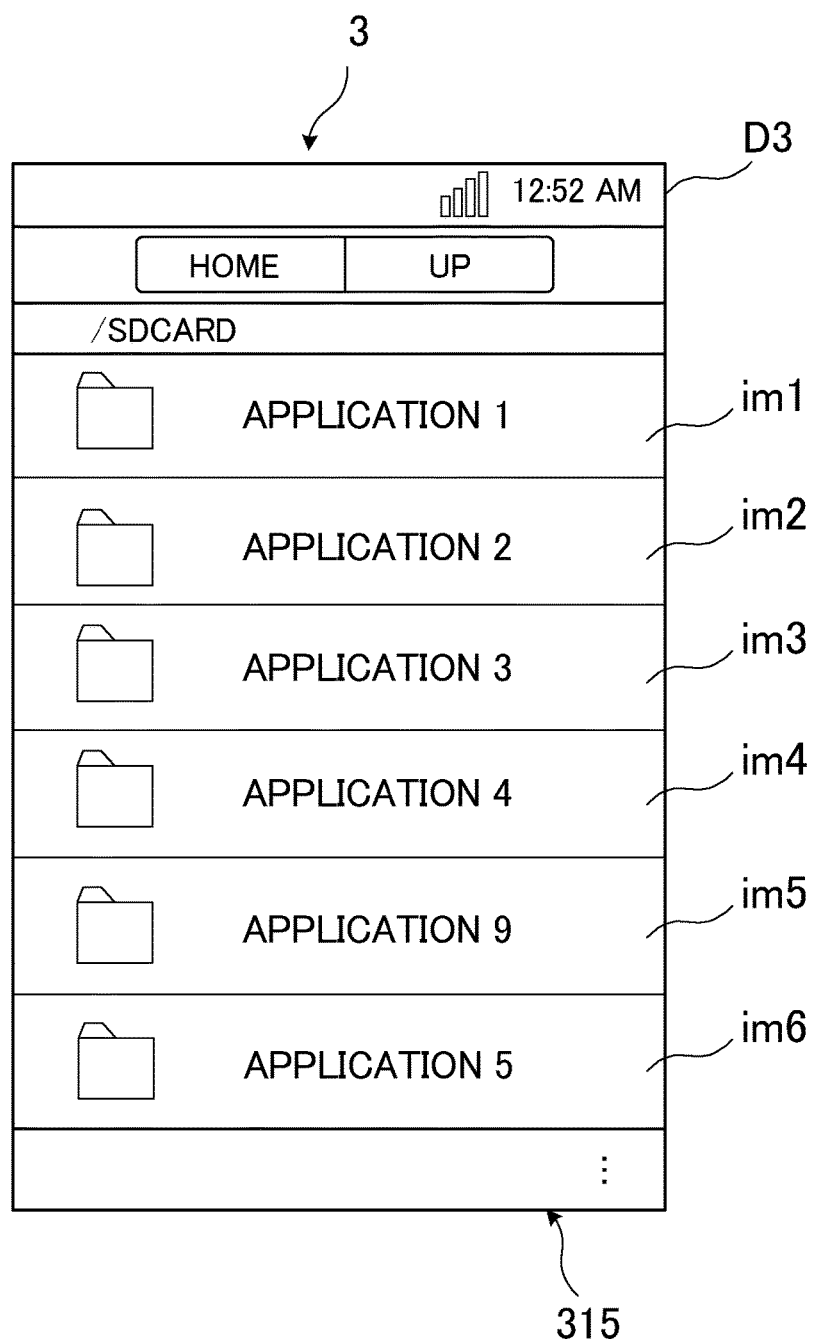
FIG. 6A is a view showing an example of a screen displayed on the display section of the communication terminal device in installing the application on the communication terminal device.

When, during display of this new application acceptance screen D2, the operator touches a region thereof where the install instruction acceptance button B1 is displayed, then the input section 319 accepts an instruction to switch the display screen (S4) and the control section 301 switches, based on this instruction to switch the display screen, the display screen of the display section 315 to an application select screen D3 shown as an example in FIG. 6A (S5). For example, respective pieces of data on applications as selectable candidates are stored in an external storage medium, such as an SD card, and the SD card is set in the communication interface 318 of the communication terminal device 3. For example, the control section 301 allows display images im1-im6 representing the respective pieces of data stored in the SD card to be displayed on the application select screen D3.

When, during display of this application select screen D3, the operator touches a region thereof where a display image representing a desired application that the operator wants to install, for example, a display image im5, is displayed, the input section 319 accepts an install instruction to install an application ("Application 9" shown as an example in FIG. 6A) associated with the display image im5 (S6).

Figure 6B:
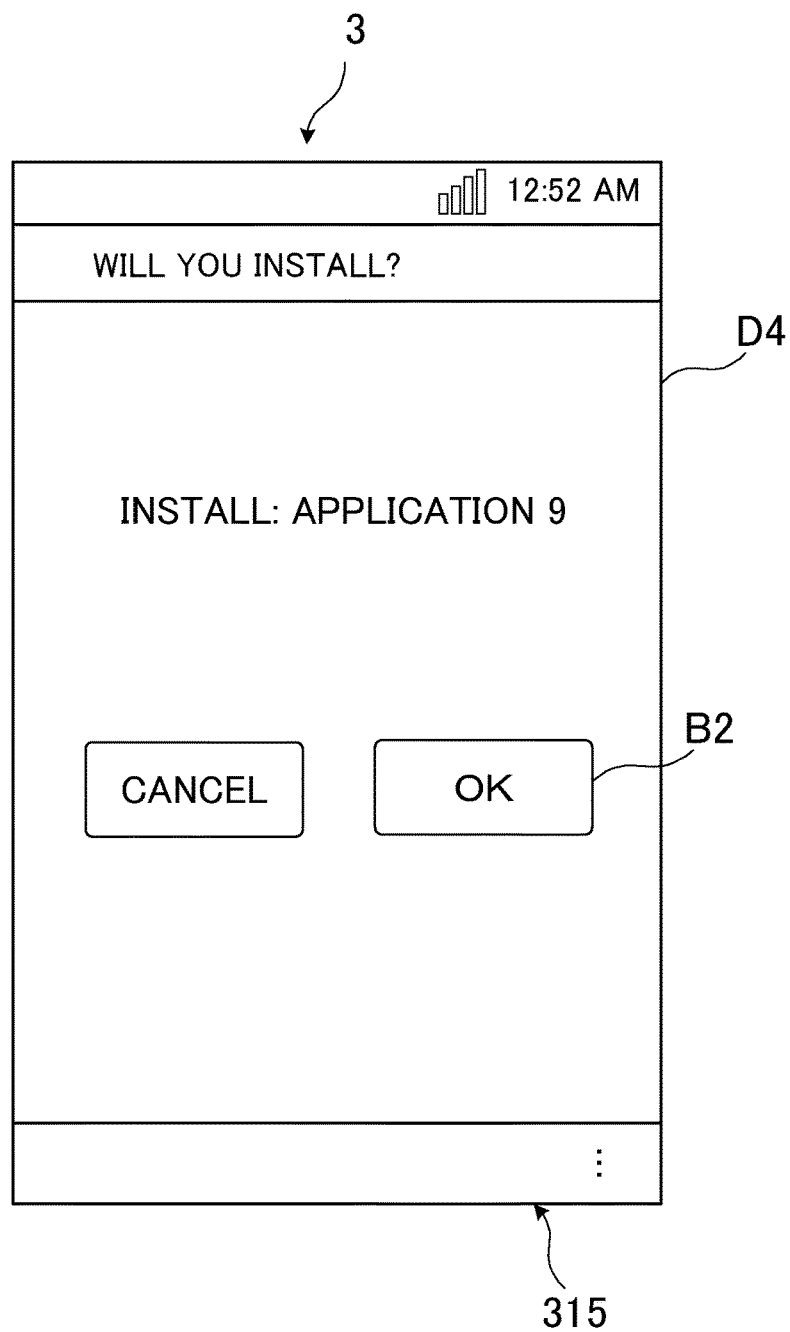
FIG. 6B is a view showing an example of a screen displayed on the display section of the communication terminal device in installing the application on the communication terminal device.

The control section 301 switches, based on the install instruction, the display screen of the display section 315 to an application confirmation screen D4 shown as an example in FIG. 6B (S7). When, during display of this application confirmation screen D4, the operator touches a region thereof where an OK button B2 is displayed, the input section 319 accepts an instruction to start installing the displayed application (for example, "Application 9") (S8).

The application acquisition section 302 reads data on the selected application (for example, "Application 9") from the SD card and installs the application into the memory 314 (S9). For example, the application to be installed is stored, in the SD card, in the form of a package into which a plurality of pieces of data are integrated, and the application acquisition section 302 takes out an OSGi bundle from the package of the specified application. For example, the application acquisition section 302 takes out a .jar file in order to create classes.dex. In doing so, the application acquisition section 302 uses, for example, the dx command in Android (registered trademark). Then, classes.dex is added to the taken .jar file. In doing so, the application acquisition section 302 uses the aapt command in Android (registered trademark). Then, the application acquisition section 302 installs the bundle into an OSGi container. In doing so, the application acquisition section 302 uses knopflerfish as the OSGi container. Thus, the install has been completed.

Note that if the above-described install processing is repeated, a plurality of different types of applications can be installed on the communication terminal device 3.

Figure 6C:
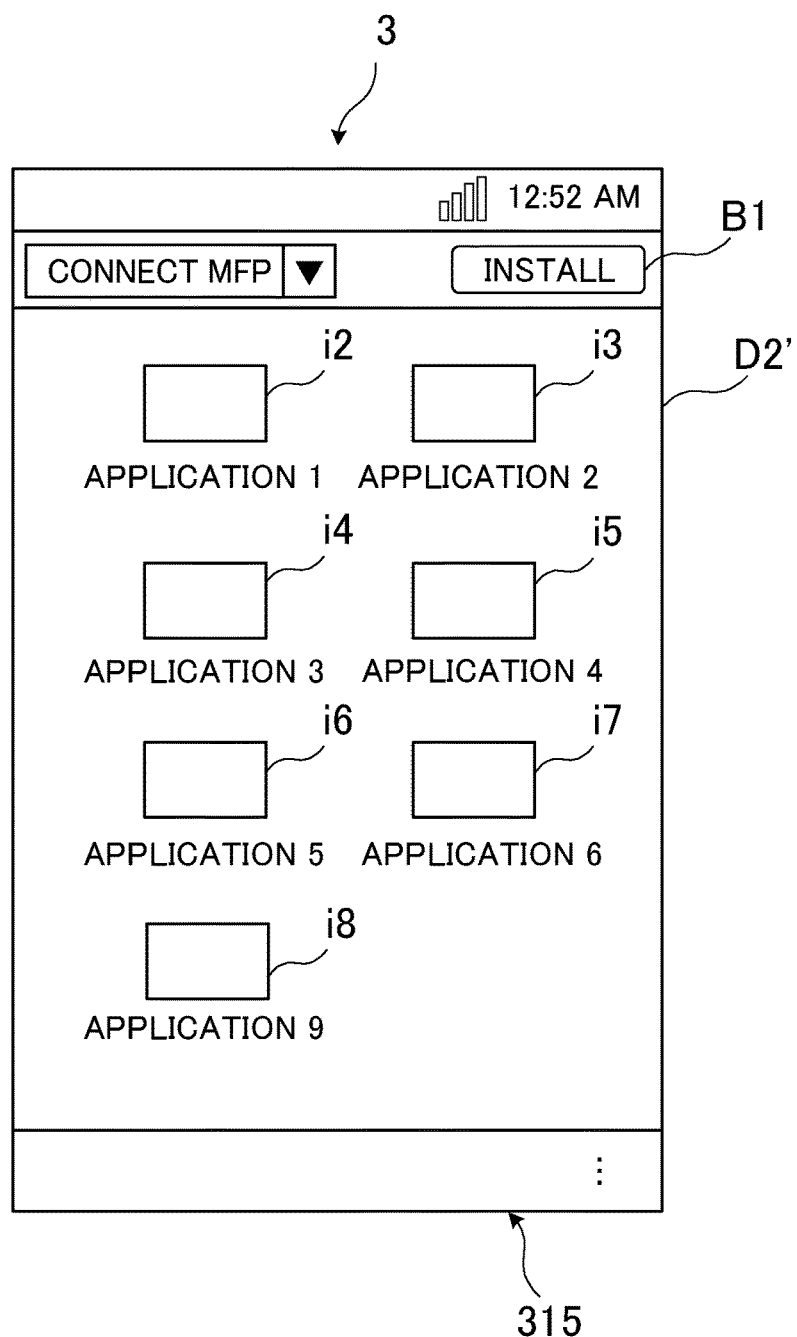
FIG. 6C is a view showing an example of a screen displayed on the display section of the communication terminal device in installing the application on the communication terminal device.

After the install, the control section 301 switches the display screen of the display section 315 to a new application acceptance screen D2', as shown as an example in FIG. 6C, containing a display image i8 representing the application the install of which has been completed (S10).

Figure 8A:
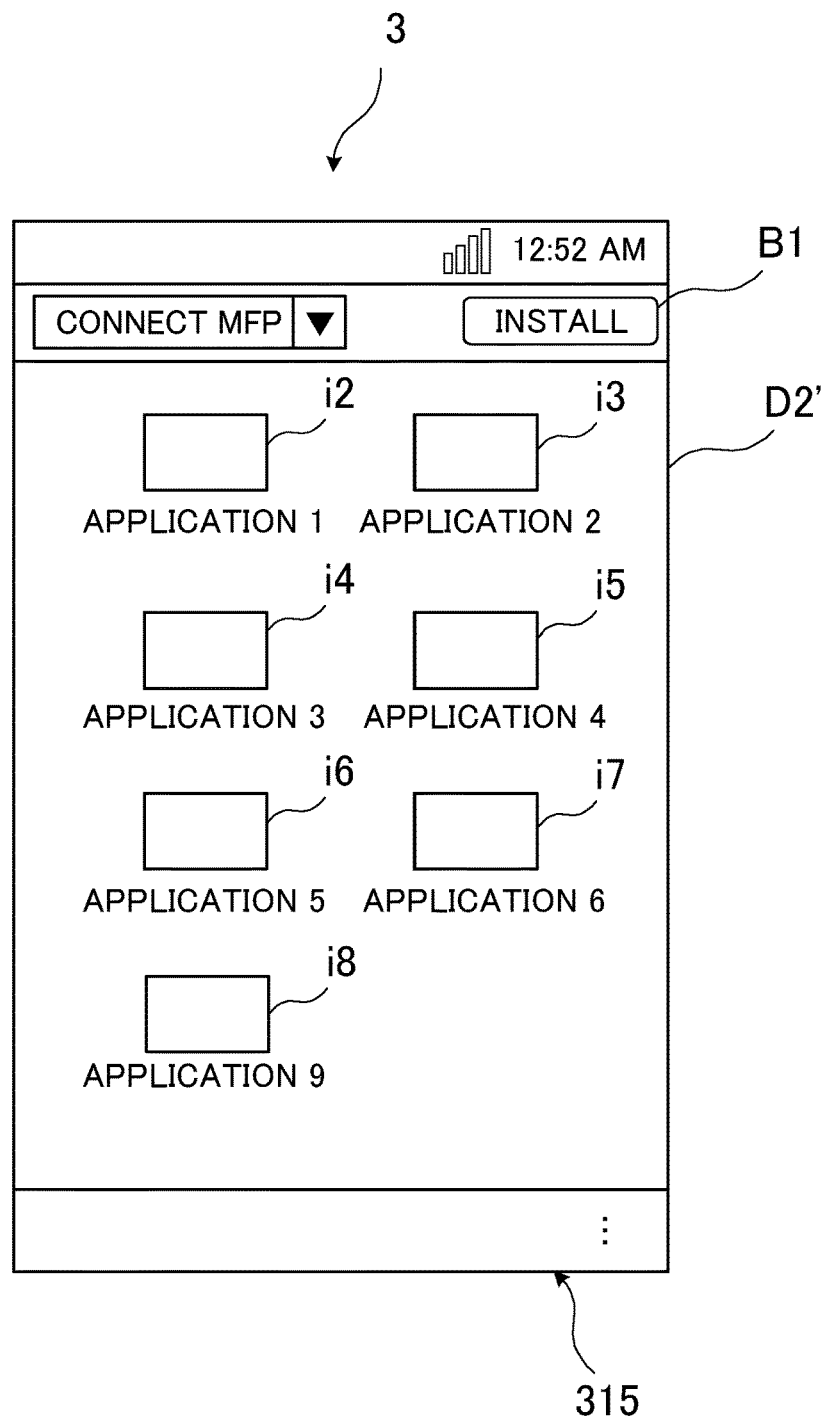
FIG. 8A is a view showing an example of a screen displayed on the display section of the communication terminal device in running the application on the communication terminal device.
Figure 8B:
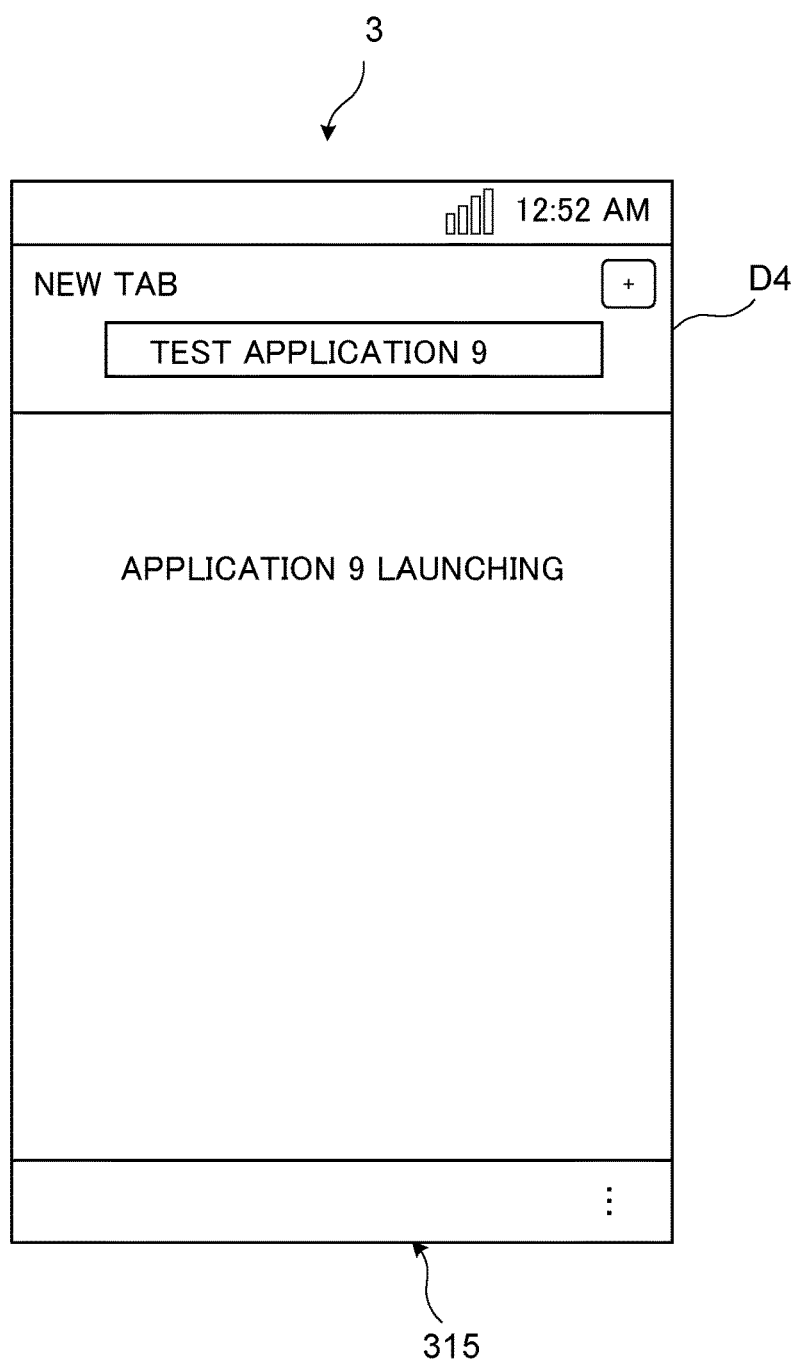
FIG. 8B is a view showing an example of a screen displayed on the display section of the communication terminal device in running the application on the communication terminal device.
Figure 8C:
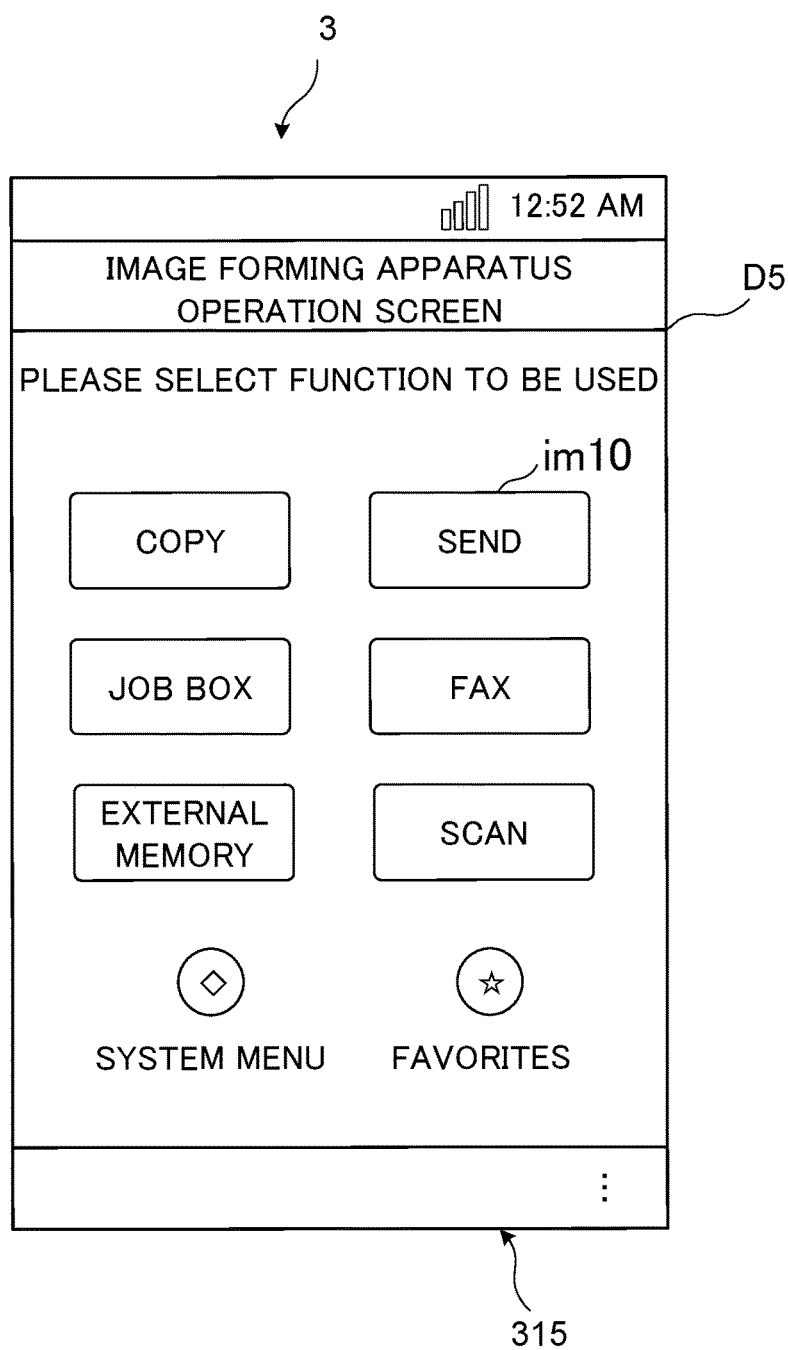
FIG. 8C is a view showing an example of a screen displayed on the display section of the communication terminal device in running the application on the communication terminal device.
Figure 9:
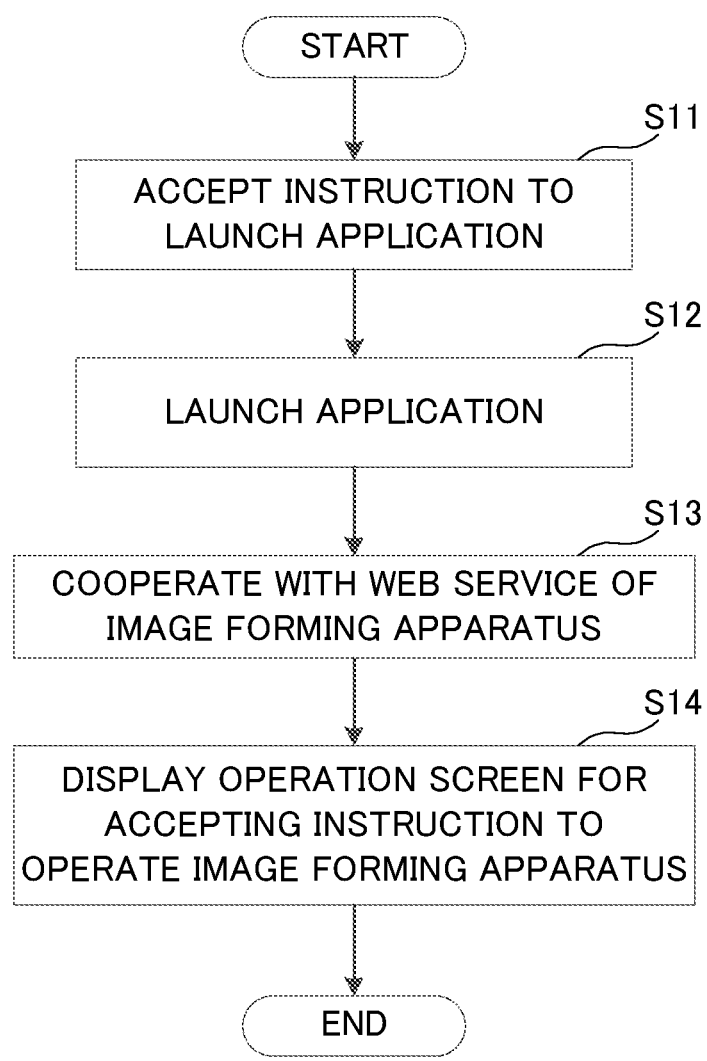
FIG. 9 is a flowchart showing processing in running the application installed on the communication terminal device.

Next, a description will be given of processing in running the application installed in the above manner. FIGS. 8A, 8B, and 8C are views showing examples of a screen displayed on the display section 315 of the communication terminal device 3 in running the application on the communication terminal device 3. FIG. 9 is a flowchart showing processing in running the application installed on the communication terminal device 3.

When, during display of the new application acceptance screen D2' on the communication terminal device 3 as shown as an example in FIG. 8A, the operator touches a region thereof where a display image representing an operator's desired application, for example, an icon i8 representing "Application 9", is displayed, the instruction acceptance section 303 accepts, through the input section 319, an instruction to launch "Application 9" associated with the icon i8 (S11). The control unit 300 launches the application (S12). Functionality-wise, the emulator 11 operates in combination with "Application 9" which is the launched application and, thus, can operate in accordance with "Application 9" through the above-described communication program under the operating system of the communication terminal device 3. During this launch processing of the application, the control section 301 allows the display section 315 to continue to display a display screen D4 shown as an example in FIG. 8B.

Then, the processing executing section 304 connects via the Internet to the image forming apparatus 1 and cooperates with the Web service function in which the image forming apparatus 1 operates based on the above-described WSDL (S13). When this cooperation is completed, the control section 301 allows the display section 315 to display an operation screen D5 shown as an example in FIG. 8C (S14). In this state, the communication terminal device 3 is ready to accept an instruction to operate the image forming apparatus 1 and can operate the image forming apparatus 1 by processing based on "Application 9".

Figure 10:
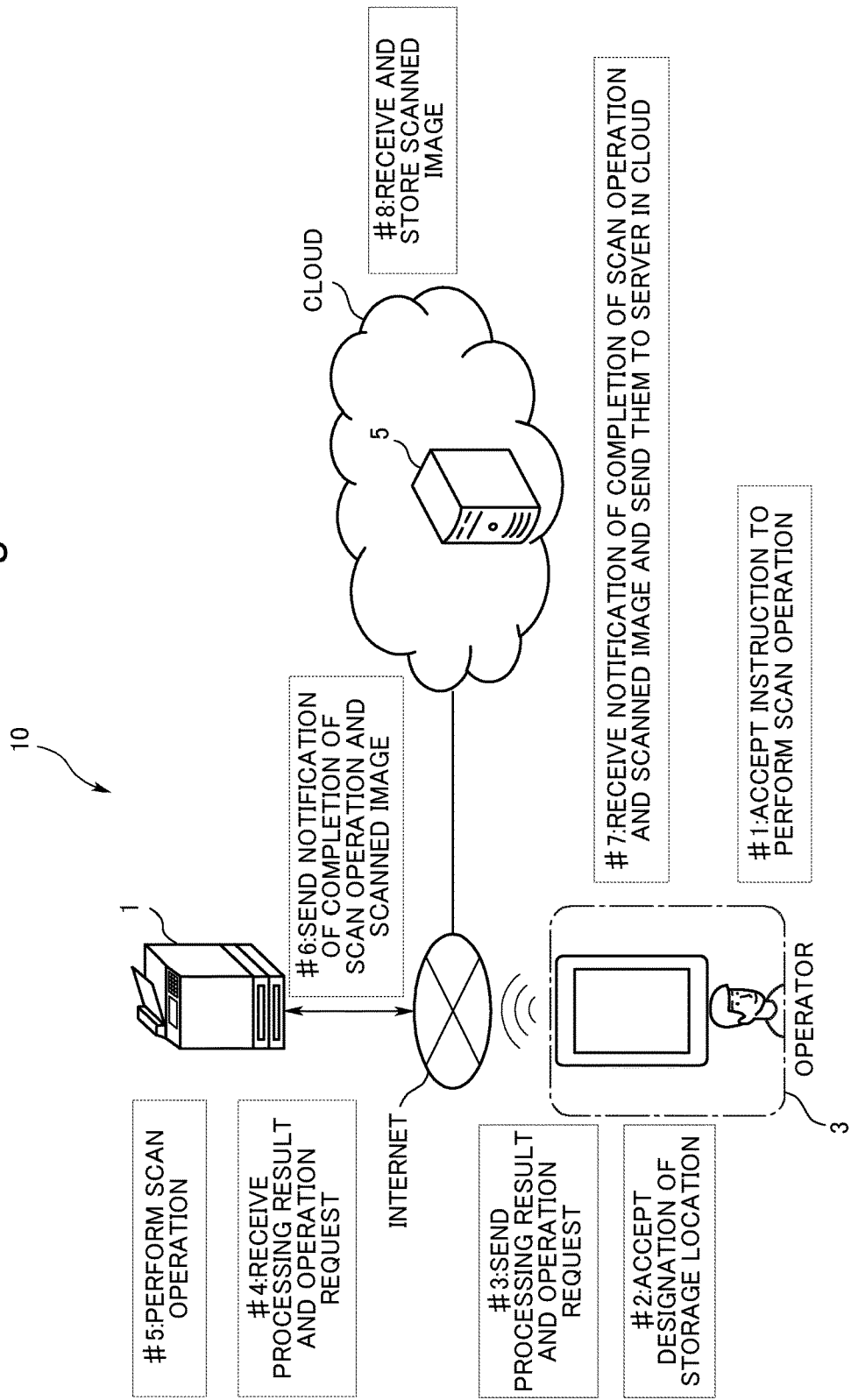
FIG. 10 is a conceptual diagram showing a processing procedure in operating the image forming apparatus with a communication program.
Figure 11:
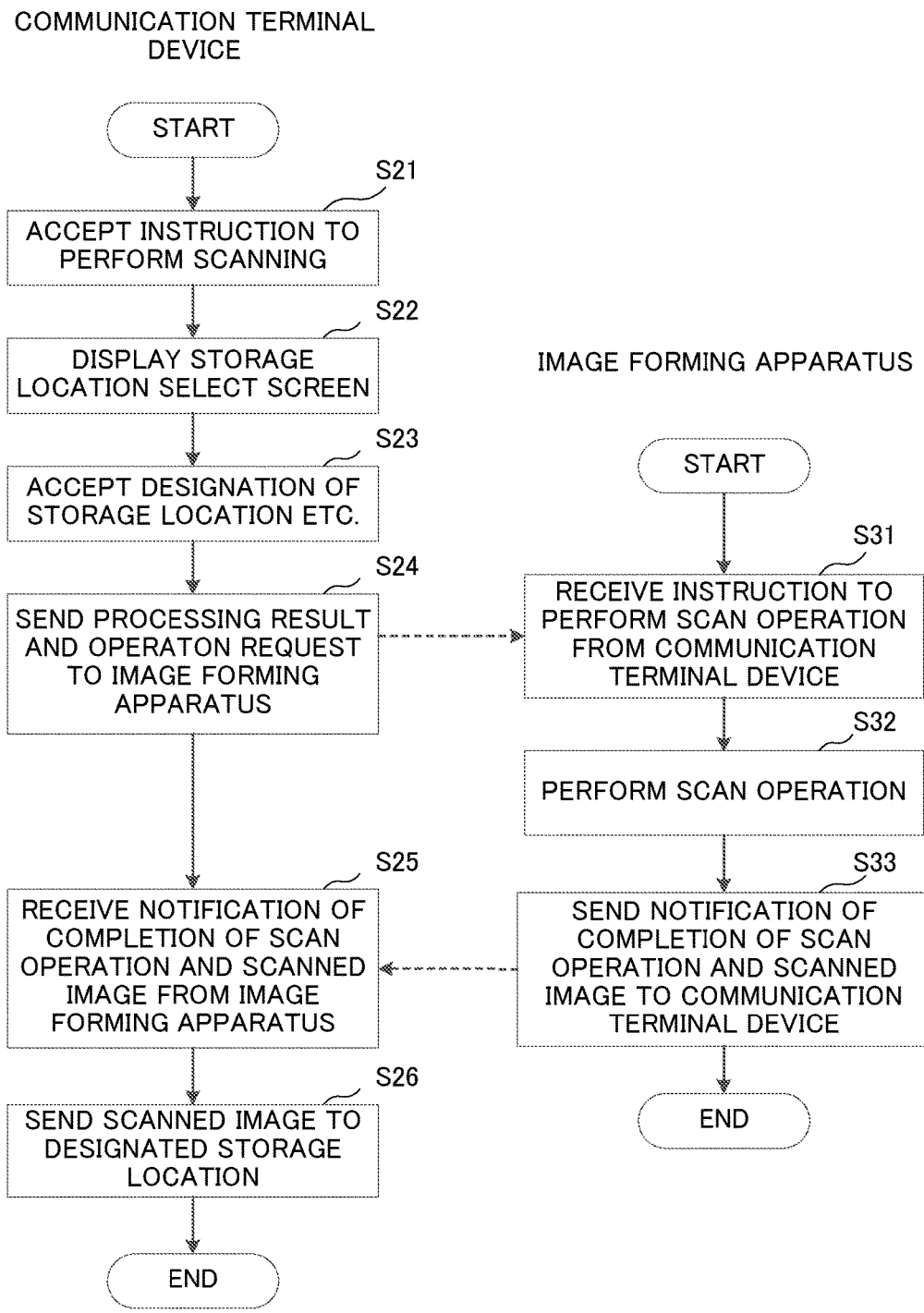
FIG. 11 is a flowchart showing the processing procedure in operating the image forming apparatus with the communication program.
Figure 12:
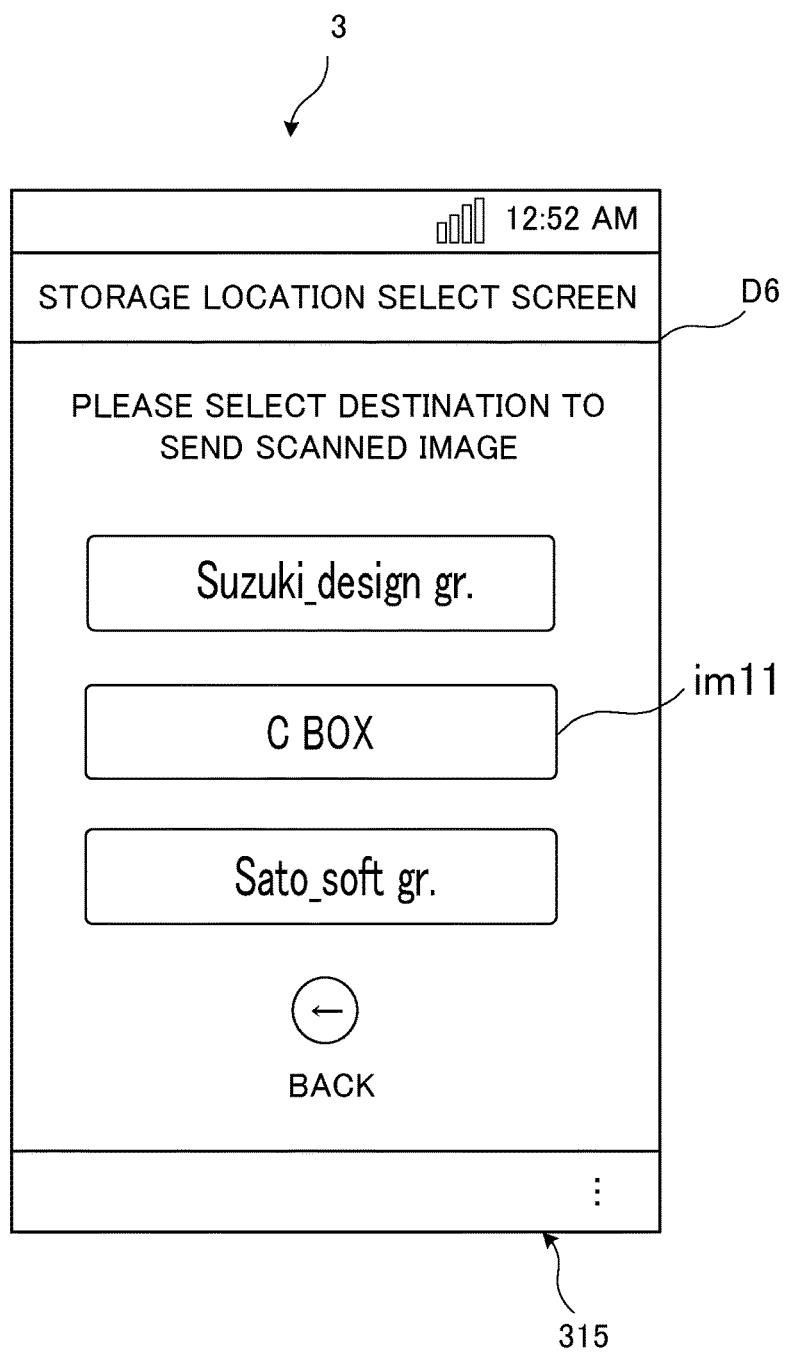
FIG. 12 is a view showing an example of a screen displayed on the display section of the communication terminal device in operating the image forming apparatus with the communication program.

Next, a description will be given of processing in operating the image forming apparatus 1 with the communication program. FIG. 10 is a conceptual diagram showing a processing procedure in operating the image forming apparatus 1 with the communication program. FIG. 11 is a flowchart showing the processing procedure in operating the image forming apparatus with the communication program. Here, a description will be given of, as an example, processing in which the communication terminal device 3 allows the image forming apparatus 1 to perform a scan operation. FIG. 12 is a view showing an example of a screen displayed on the display section of the communication terminal device in operating the image forming apparatus with the communication program.

First, the operator places an original document subject to scanning on the image scanning unit 110 of the image forming apparatus 1. When, during display of the operation screen D5 on the display section 315 of the communication terminal device 3, the operator touches, for example, a region of the operation screen D5 where a "Send" image im10 is displayed, the instruction acceptance section 303 accepts, through the input section 319, an instruction to allow the image forming apparatus 1 to perform a scan operation (FIG. 10: #1, FIG. 11: S21). Next, the control section 301 allows the display section 315 to display a storage location select screen D6 (shown as an example in FIG. 12) prompting the selection of a storage location for a scanned image (FIG. 11: S22).

When, during display of the storage location select screen D6 on the display section 315 of the communication terminal device 3, the operator touches a display image on the storage location select screen D6 representing a desired storage location, for example, a "C Box" image im11 representing a server in a cloud, the instruction acceptance section 303 accepts, through the input section 319, a designation of a storage location for a scanned image (FIG. 10: #2, FIG. 11: S23). Although not particularly shown here, the instruction acceptance section 303 also accepts specifications associated with the scan operation, including a specification of multicolor or black-and-while and specifications of various parameters for image scanning, such as resolution, density, and both-sided or single-sided scanning. After this acceptance of the designation of the storage location and the specifications, the communication section 305 sends, to the image forming apparatus 1, information indicating various parameters accepted by the above specifications for the image scanning as a processing result and the scan operation execution instruction, i.e., the instruction to allow the image scanning unit 110 to perform an operation for scanning the placed original document, as an operation request through HTTP communication via the Internet (FIG. 10: #3, FIG. 11: S24).

When in the image forming apparatus 1 the data sending/receiving section 102 receives the processing result and the operation request (FIG. 10: #4, FIG. 11: S31), the control section 101 accordingly executes the scan operation (FIG. 10: #5, FIG. 11: S32). In other words, the control section 101 allows the image scanning unit 110 to scan the original document placed thereon. After the completion of the scan operation, the data sending/receiving section 102 of the image forming apparatus 1 sends, to the communication terminal device 3 via the Internet, a notification indicating that the scan operation is completed and a scanned image obtained by the scan operation (FIG. 10: #6, FIG. 11: S33).

When in the communication terminal device 3 the communication section 305 receives the notification of completion of the scan operation and the scanned image through the communication interface 318 (FIG. 10: #7, FIG. 11: S25), the communication section 305 sends the scanned image to the storage location accepted in S23 (FIG. 10: #7, FIG. 11: S26). For example, when the "C Box", which is a server in a cloud, is accepted as the storage location, the communication section 305 sends the received scanned image via the Internet to the server "C Box" in the cloud. When the server "C Box" in the cloud receives the scanned image, it stores the scanned image on its storage device (FIG. 10: #8).

Thus, once the operator has installed the above application on the communication terminal device 3, this makes it possible for the operator to operate the image forming apparatus 1 with the communication terminal device 3 and to execute a sequence of processing, such as further transfer of data received from the image forming apparatus 1 to a server in a cloud, on the communication terminal device 3.

Furthermore, without the need to install a complicated application on the image forming apparatus 1 but with only the storage of a program like WSDL as described above, the image forming apparatus 1 can operate based on instructions from the communication terminal device 3 and, additionally, for example, data obtained from the image forming apparatus 1 can be processed on the communication terminal device 3 side in cooperation with the cloud or the like without any processing load on the image forming apparatus 1.

Therefore, this embodiment can impart to the communication terminal device 3 an operability to operate the image forming apparatus 1 in cooperation with the image forming apparatus 1 and enables the image forming apparatus 1 to perform a new function without installing any application on the image forming apparatus 1.

The present invention is not limited to the configuration of the above embodiment and can be modified in various ways. For example, although the description in the above embodiment has been given taking a multifunction peripheral as one embodiment of the image forming apparatus according to the present invention, this embodiment is merely illustrative and the image forming apparatus may be any other image forming apparatus, such as a printer, a copier or a facsimile machine. Furthermore, although in the above embodiment the communication between the communication terminal device 3 and the image forming apparatus 1 is described to be performed via the Internet, the communication between the communication terminal device 3 and the image forming apparatus 1 can also be performed via a LAN.

Moreover, the configuration and processing shown in the above embodiment with reference to FIGS. 1 to 12 are merely illustrative of the present invention and are not intended to limit the present invention to the above particular configuration and processing.

What is claimed is:

1. A communication terminal device including a control unit formed of a CPU, the CPU functioning, when executing a communication program, as:
    an application acquisition section that acquires, from an external storage medium in which a plurality of applications is stored, an application that is prepared to operate a predetermined electronic apparatus and is specified by a user;
    an instruction acceptance section that accepts an operation instruction for processing indicated by the application acquired by the application acquisition section;
    a processing executing section that executes, in accordance with the application, the processing indicated by the operation instruction accepted by the instruction acceptance section, the processing creating a setting necessary for operating the electronic apparatus, in a state where an emulator combined with a framework intervenes between the application and an operating system of the communication terminal device and where the application is runnable under the operating system of the communication terminal device; and
    a communication section that sends to the electronic apparatus a result of the processing executed by the processing executing section and an operation request for the operation by the electronic apparatus,
    wherein the instruction acceptance section further accepts, as the operation instruction, a storage location in a cloud for data obtained by processing performed on the electronic apparatus in response to the processing result and the operation request both sent from the communication section to the electronic apparatus,
    the processing executing section includes a library for use with the application, the emulator retrieves from the library a necessary code for executing a function of the application, and based on the retrieved code, the processing executing section executes processing indicated by the operation instruction in accordance with the application, thus making the application runnable under the operating system, and
    the communication section receives from the electronic apparatus through the emulator the data obtained by the processing performed on the electronic apparatus in response to a result of the processing result and the operation request and sends, by operation of the emulator based on the application, the data to the storage location in the cloud accepted by the instruction acceptance section.

2. The communication terminal device according to claim 1, wherein the communication section performs sending of the processing result and the operation request to the electronic apparatus via the Internet.

3. The communication terminal device according to claim 1, wherein the application acquisition section takes out an OSGi bundle from a package of the application and installs the OSGi bundle into an OSGi container, so that the processing executing section makes the processing of creating the setting necessary for operating the electronic apparatus runnable in accordance with the application.

4. A communication system including a communication terminal device and an image forming apparatus,
    the communication terminal device including a first control unit formed of a first CPU, the first CPU functioning, when executing a communication program, as:
        an application acquisition section that acquires, from an external storage medium in which a plurality of applications is stored, an application that is prepared to operate a predetermined electronic apparatus and is specified by a user;
        an application acquisition section that acquires an application prepared to operate the image forming apparatus;
        an instruction acceptance section that accepts an operation instruction for processing indicated by the application acquired by the application acquisition section;
        a processing executing section that executes, in accordance with the application, the processing indicated by the operation instruction accepted by the instruction acceptance section, the processing creating a setting necessary for operating the image forming apparatus, in a state where an emulator combined with a framework intervenes between the application and an operating system of the communication terminal device and where the application is runnable under the operating system of the communication terminal device; and
        a communication section that sends to the image forming apparatus a result of the processing executed by the processing executing section and an operation request for the operation by the image forming apparatus,
    the image forming apparatus including a second control unit formed of a second CPU, the second CPU functioning, when executing a communication control program, as:

a receiving section that receives the result of the processing and the operation request from the communication section of the communication terminal device; and a control section that allows an operating mechanism of the image forming apparatus to perform processing associated with the result of the processing and the operation request received by the receiving section, wherein the instruction acceptance section of the communication terminal device further accepts, as the operation instruction, a storage location in a cloud for data obtained by processing performed on the image forming apparatus in response to the processing result and the operation request both sent from the communication section to the image forming apparatus, the processing executing section includes a library for use with the application, the emulator retrieves from the library a necessary code for executing a function of the application, and based on the retrieved code, the processing executing section executes processing indicated by the operation instruction in accordance with the application, thus making the application runnable under the operating system, and the communication section receives from the image forming apparatus through the emulator the data obtained by the processing performed on the image forming apparatus in response to the processing result and the operation request and sends, by operation of the emulator based on the application, the data to the storage location in the cloud accepted by the instruction acceptance section.

* * * * *